United States Patent [19]

Christianson

[11] Patent Number: 5,240,084
[45] Date of Patent: Aug. 31, 1993

[54] CONVERTER ASSEMBLY FOR CONVERTING A DRIVE-WHEEL TRACTOR INTO A TRACK-DRIVEN TRACTOR

[76] Inventor: Peter J. Christianson, R.R. #3, P.O. Box 135, Fargo, N. Dak. 58104

[21] Appl. No.: 858,396

[22] Filed: Mar. 26, 1992

[51] Int. Cl.$^5$ .......................................... B62D 55/04
[52] U.S. Cl. .................... 180/9.21; 180/9.1; 180/9.26; 305/35 EB
[58] Field of Search .................. 180/9.1, 9.21, 9.26; 305/16, 35 EB, 17

[56]  References Cited
U.S. PATENT DOCUMENTS

| | | |
|---|---|---|
| 1,238,762 | 9/1917 | Hapeman ............................ 180/9.26 |
| 1,337,905 | 4/1920 | Groves . |
| 1,449,036 | 3/1923 | Feden . |
| 1,774,835 | 9/1930 | Lombard . |
| 1,808,735 | 6/1931 | Henneuse et al. . |
| 1,810,138 | 6/1931 | Kincannon . |
| 1,870,632 | 8/1932 | Kennedy . |
| 2,265,986 | 12/1941 | Allin . |
| 2,315,421 | 3/1943 | Heaslet . |
| 2,416,679 | 3/1947 | Curtis . |
| 2,587,813 | 3/1952 | Bombardier . |
| 2,706,663 | 4/1955 | Heckerman, Jr. . |
| 2,838,345 | 6/1958 | Miller . |
| 3,039,828 | 6/1962 | Johnston . |
| 3,082,044 | 3/1963 | Klemm et al. . |
| 3,170,531 | 2/1965 | Katzenberger . |
| 3,664,449 | 5/1972 | Vardell . |
| 3,801,164 | 4/1974 | Mazzarins . |
| 3,857,616 | 12/1974 | Tucker et al. . |
| 3,860,080 | 1/1975 | Firstenberg . |
| 4,253,708 | 3/1981 | Haslett . |
| 4,448,273 | 5/1984 | Barbieri ............................. 180/9.21 |

FOREIGN PATENT DOCUMENTS 2159112 11/1985 United Kingdom ............... 180/9.26

Primary Examiner—Robert J. Oberleitner
Assistant Examiner—Carla Mattix
Attorney, Agent, or Firm—Schroeder & Siegfried

[57] ABSTRACT

A converter assembly for converting a drive-wheel-driven tractor into a track-driven tractor, the assembly having its frame separate and unattached relative to the frame of the tractor and constructed and arranged, together with a continuous track, to be positioned beneath the drive-wheel of the tractor, and within the track, in cooperating position with the drive-wheel and track, to effectively extend the ground-engaging area of the tractor. A pair of transversely spaced, relatively light, plate members rotatably mount a pair of idler wheels, one ahead and one behind the drive-wheel within the track. A pair of alignment rollers are also rotatably mounted between the plate members in engaging and aligning relation ahead and behind the drive-wheel, whereby the converter assembly is maintained in aligned relation with the drive-wheel, and some of the weight is transferred from the drive-wheel, through the alignment rollers and plate members, to the idler rollers. The plate members permit easy application of the converter assembly to, or withdrawal from, the drive-wheel by merely jacking the latter into an elevated position and applying or removing, as the case may be, the converter assembly and track by merely removing the outside plate member before applying or removing the assembly form the drive-wheel, and re-applying same after the lower portion of the drive-wheel is extended into the track and assembly or is removed therefrom, as the case may be. The entire converter assembly is otherwise entirely unattached relative to the frame of the tractor.

40 Claims, 12 Drawing Sheets

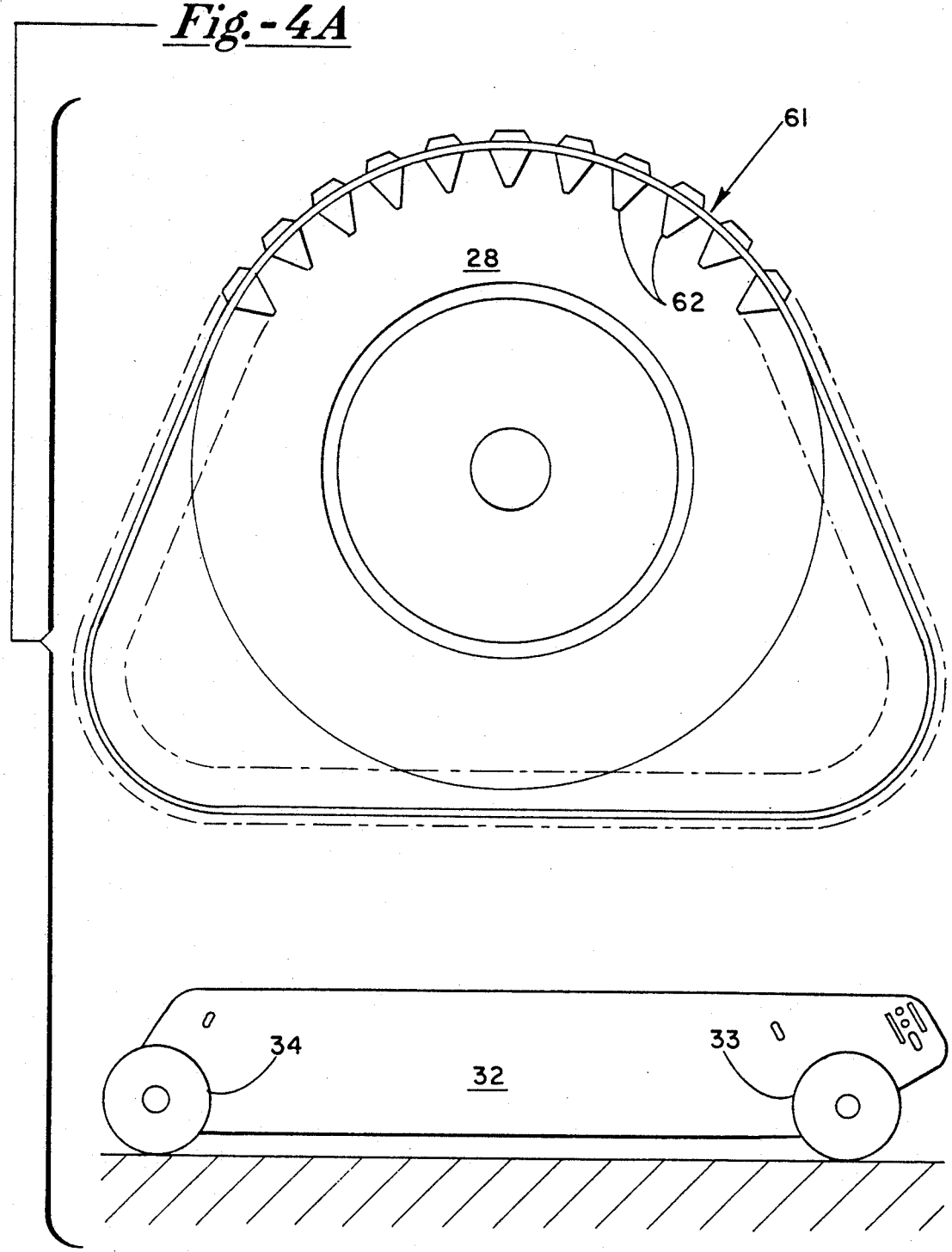

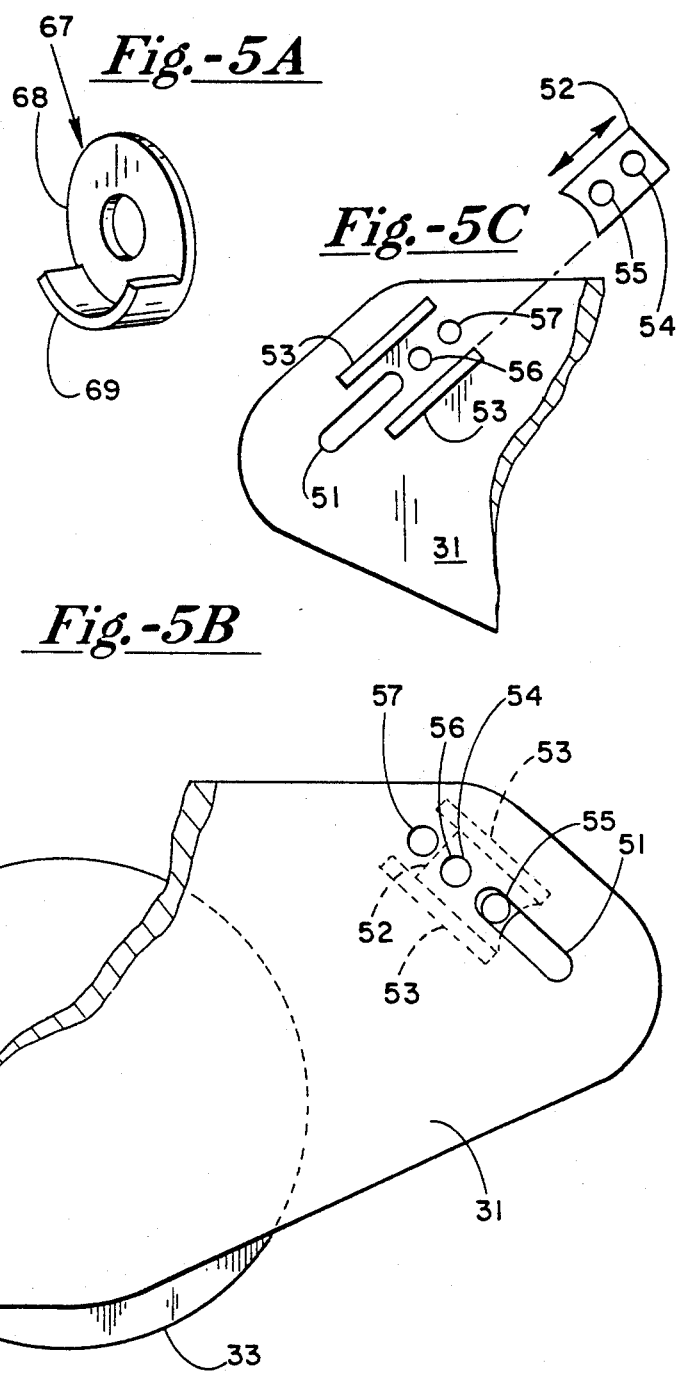

CONVERTER ASSEMBLY FOR CONVERTING A DRIVE-WHEEL TRACTOR INTO A TRACK-DRIVEN TRACTOR

BACKGROUND OF THE INVENTION

It is old to extend the ground area which is contacted by a track surrounding the drive-wheel of a tractor by using a plurality of associated non-driven wheels carried by a special sub-frame mounted on the tractor, the non-driven wheels being disposed ahead and behind the axis of the drive-wheel, with the track extending around the drive-wheel, as well as the idler wheels, to thereby increase the ground area contacted by the power-driven ground engaging member, the track.

It is also old to distribute the weight of a tractor over a larger area by spreading the weight throughout the longer distance of the ground-engaging track. All of the above modifications of tractors, however, have always involved the need for a sub-assembly mounted directly on the tractor. Such sub-assemblies are necessarily relatively costly and heavy and, therefore, substantially increase the expense and over-all weight of the tractor. Most, if not all, experience tracking problems, are supported by the tractor frame and, in general, have not proved successful. As a consequence, there is still a definite need for an inexpensive but effective conversion unit for converting a wheel-driven tractor into a track-driven vehicle. This is particularly true because it is a recognized fact that traction crawler-type tractors are more effective than rubber-tired tractors, when used on soft ground or under muddy soil conditions.

BRIEF SUMMARY OF THE INVENTION

The invention consists of the provision of an auxiliary drive assembly for converting a drive-wheel tractor into a track-driven tractor, the assembly being unsupported by and entirely free of the tractor frame and of the entire tractor, except for the track within which it operates. It is light in weight and very simple to attach to, or detach from, a conventional rubber-tired drive-wheel tractor. Each of the two required assemblies is comprised of a pair of transversely spaced parallel mounting plates which cooperatively support a transversely extending idler wheel or roller at their opposite ends and an associated transverse alignment roller or wheel, inwardly and adjacent to each idler wheel. Each drive-wheel of the tractor extends downwardly from above between the two parallel mounting plates of its associated converter assembly and engages the innersurface of the track, with a substantial portion of the weight of the tractor being applied to the ground through the track.

A substantial portion of the weight of the tractor is also borne by the front and rear idler wheels and the portions of the track extending therearound. This weight is transmitted to the idler wheels through the alignment rollers and the mounting plates upon which all of the above rollers are mounted. The idler wheels, in turn, transmit weight to the track.

In the preferred form of the invention, a lead roller is also mounted between the mounting plates ahead and slightly above the forward idler roller and within the track. The lead roller facilitates the ability of the track to crawl upwardly and over obstructions such as stones, steep earth deposits, etc.

One such assembly is applied to each drive-wheel of the tractor whenever it is desired to convert a drive-wheel tractor into a track-driven tractor. Each assembly is completely detached relative to the tractor except for the track which extends around the assembly and the drive-wheel. Each drive-wheel merely extends downwardly, from above, between the mounting plates of its associated converter assembly to cause the track to be tightened and extend horizontally in ground-engaging position between the two idler rollers located ahead and behind the drive-wheel.

To remove the converter assemblies and convert the tractor back to a drive-wheel ground engaging tractor, it is only necessary to jack the tractor upwardly to remove the weight of the tractor off the drive-wheels, whereupon the track will loosen. By removing the outside mounting plates, each of the converter assemblies can be removed from within its track, and thereafter the track itself can be removed from the upper surface of the drive-wheel.

The guide roller may accomplish its purpose in a number of different ways, as shown. It may have guide discs, one at each end, which extend radially outwardly at opposite sides of the drive-wheel and at opposite ends of its associated idler wheel, or it may utilize interengaging and cooperating ribs and grooves, one of which is carried by the exterior surfaces of the drive-wheel and idler wheel, and the other of which is carried by the exterior surface of the alignment wheel. Also, if desired, the track may carry at each of its sides, a circumferentially continuous array of aligning elements which extend inwardly inside of one of the mounting plates to maintain the track in aligned relation with the drive-wheel and converter assembly.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 4A is a diagrammatic side elevational view showing the position of the track in the first step of applying one of my converter assemblies to a tractor drive-wheel;

FIG. 5A is a diagrammatic perspective view of a washer shim which I may utilize within the slot of the mounting plates in which the alignment roller of my converter assembly is mounted;

FIG. 5B is a diagrammatic fragmentary side elevational view of the forward end portion of one of the mounting plates of my preferred form of invention, without the lead roller mounted thereon, and with the washer shim of FIG. 5A installed;

FIG. 5C is a diagrammatic fragmentary perspective view of the inner side of the forward end of one of the mounting plates, showing the mounting for the end of the lead roller;

DETAILED DESCRIPTION OF THE INVENTION

Figure 1:
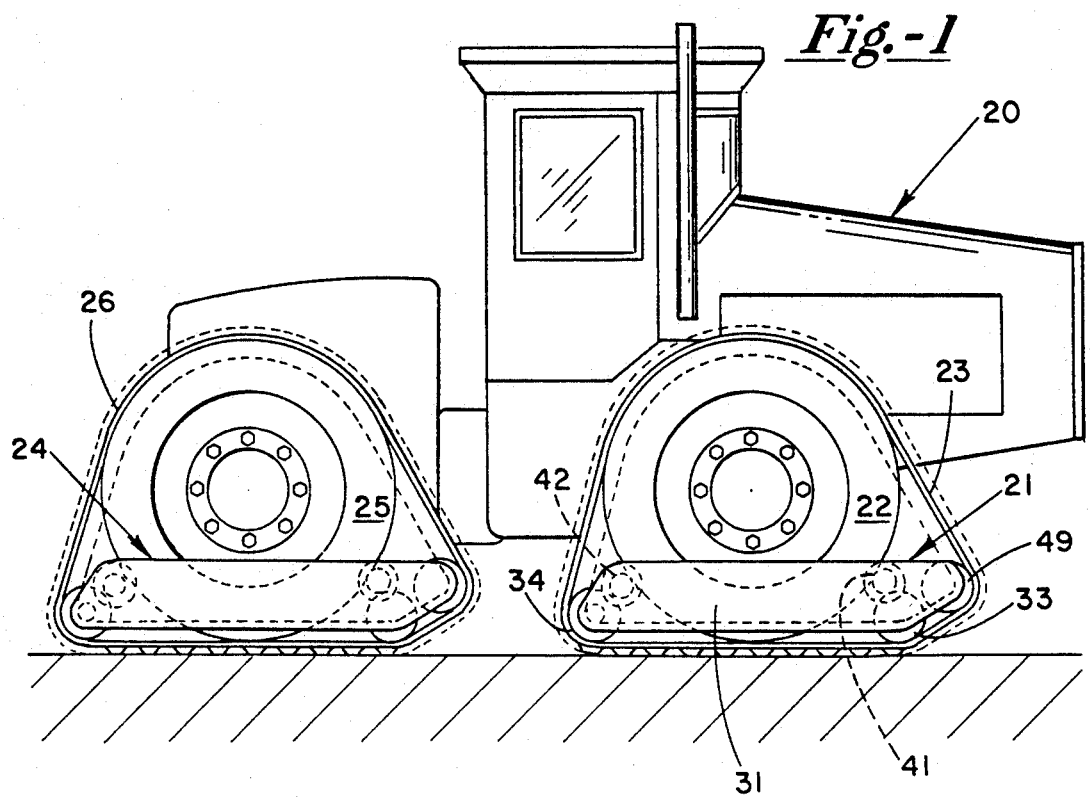
FIG. 1 is a diagrammatic side elevational view of a four-wheel-drive tractor, showing two of the preferred embodiments of my invention disposed beneath two drive-wheels thereof.

As described hereinabove, FIG. 1 shows a pair of my converter assemblies mounted on the near side of a four-wheel-drive tractor 20. Thus, assembly 21 is mounted upon drive-wheel 22 with track 23 encircling both. Likewise, assembly 24 is mounted upon drive-wheel 25 with track 26 encircling both. In use, similar assemblies (not shown) are mounted in similar fashion upon the drive-wheels on the opposite side of the tractor.

Figure 2:
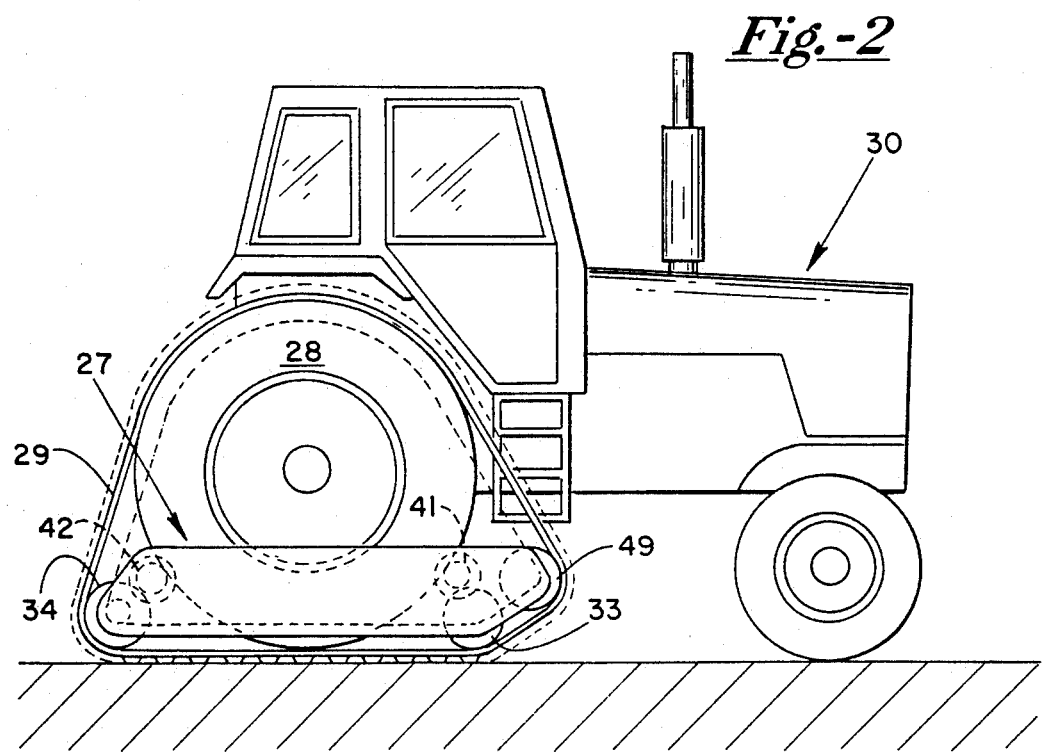
FIG. 2 is a diagrammatic side elevational view of a two-wheel-drive tractor, showing one of the preferred embodiments of my invention disposed beneath one of the drive-wheels thereof.

In similar fashion, FIG. 2 shows one of my preferred converter assemblies 27 mounted upon the near side drive-wheel 28 with a track 29 to drive a two-wheel-drive tractor 30.

Figure 3:
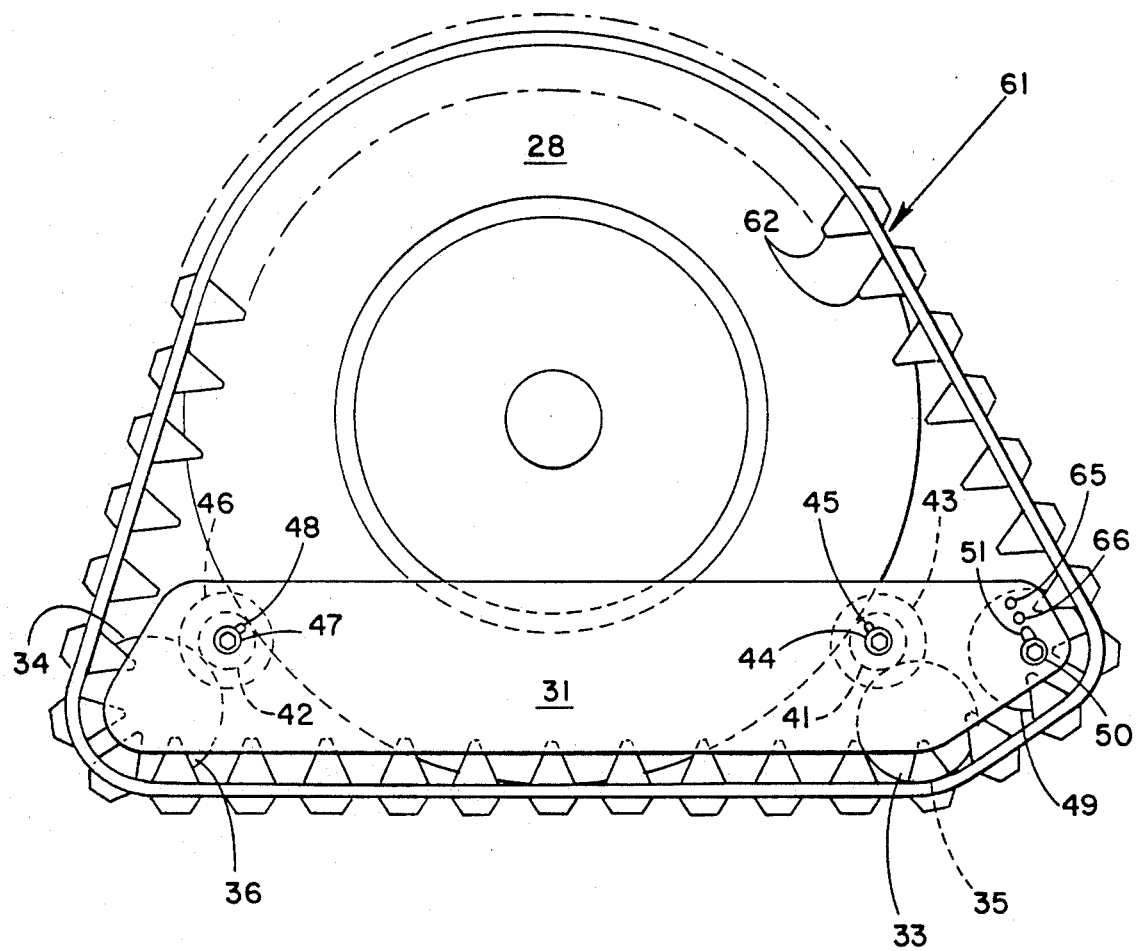
FIG. 3 is a diagrammatic side elevational view of the preferred form of my invention in operating position.
Figure 7:
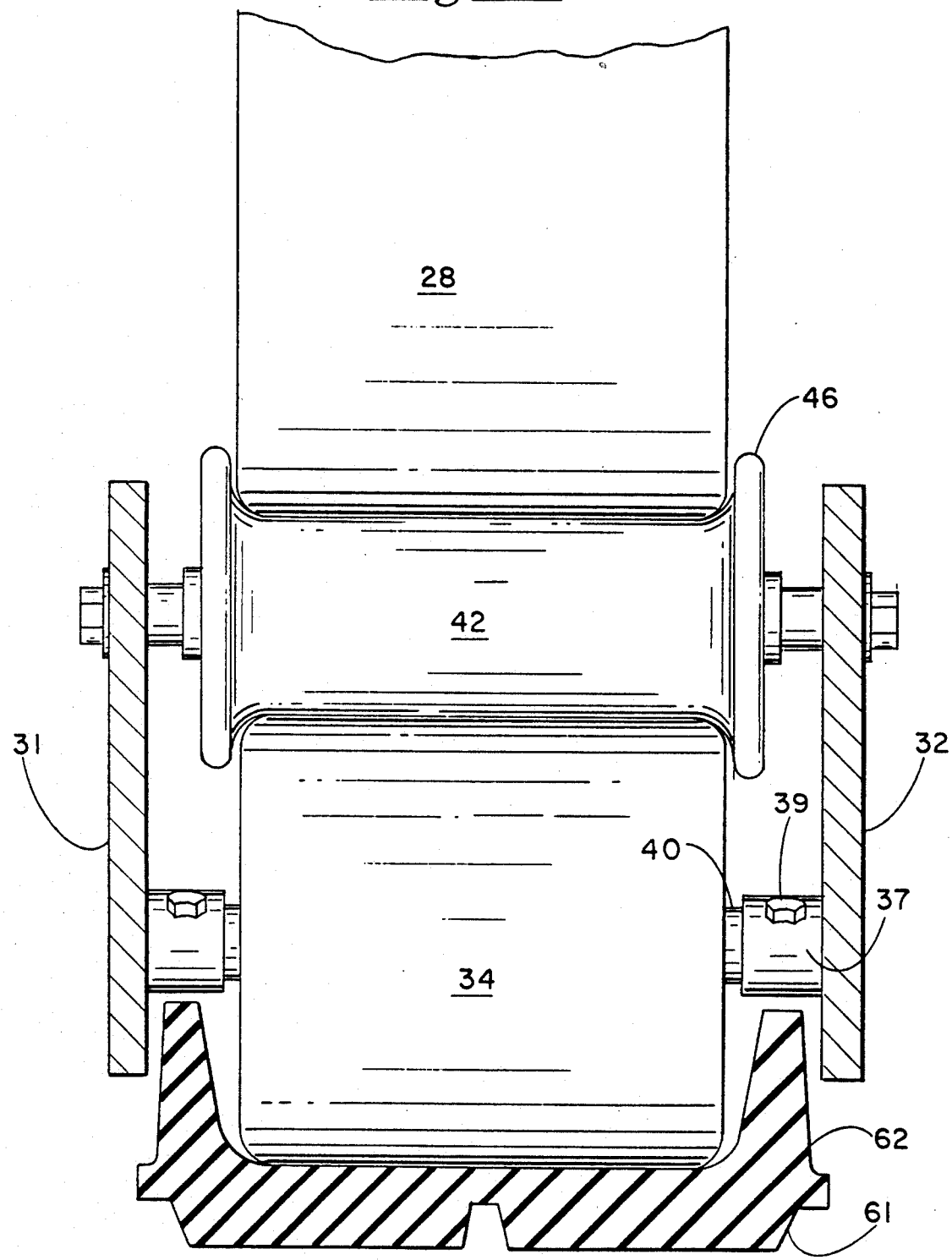
FIG. 7 is a diagrammatic fragmentary vertical sectional view taken through the rear end of the preferred form of my converter assembly, showing the rear idler wheel, alignment roller and the drive-wheel in elevation.

FIG. 3 shows the preferred form of my invention mounted upon such a drive-wheel 28. As shown, it is comprised of a pair of elongated parallel metal mounting plates 31 and 32 which are somewhat longer than the diameter of the drive-wheel 28 and are transversely spaced to accommodate the drive-wheel 28 therebetween in fairly close relationship, as shown in FIG. 7.

Mounted upon opposite end portions of mounting plates 31 and 32 is a pair of idler rollers or wheels, 33 and 34, in position so that their lower circumferential surfaces 35 and 36, respectively extend below the lower edges of the mounting plates, as shown in FIG. 3. As shown, the forwardmost peripheral surface of idler wheel 33 is forward of the corresponding surface of the drive-wheel 28, and the rearwardmost peripheral surface of the idler wheel 34 is disposed rearwardly of the corresponding surface of drive-wheel 28. As shown in FIG. 4D, each end of the shaft of the idler wheels is mounted in a tubular socket 37, which is carried upon the inside surface of the mounting plates 31 and 32, and each end of the shaft is secured by a nut 38 and bolt 39. Each idler wheel is rotatably mounted on its shaft 40 via bearings, not shown, as is conventional.

Figure 6:
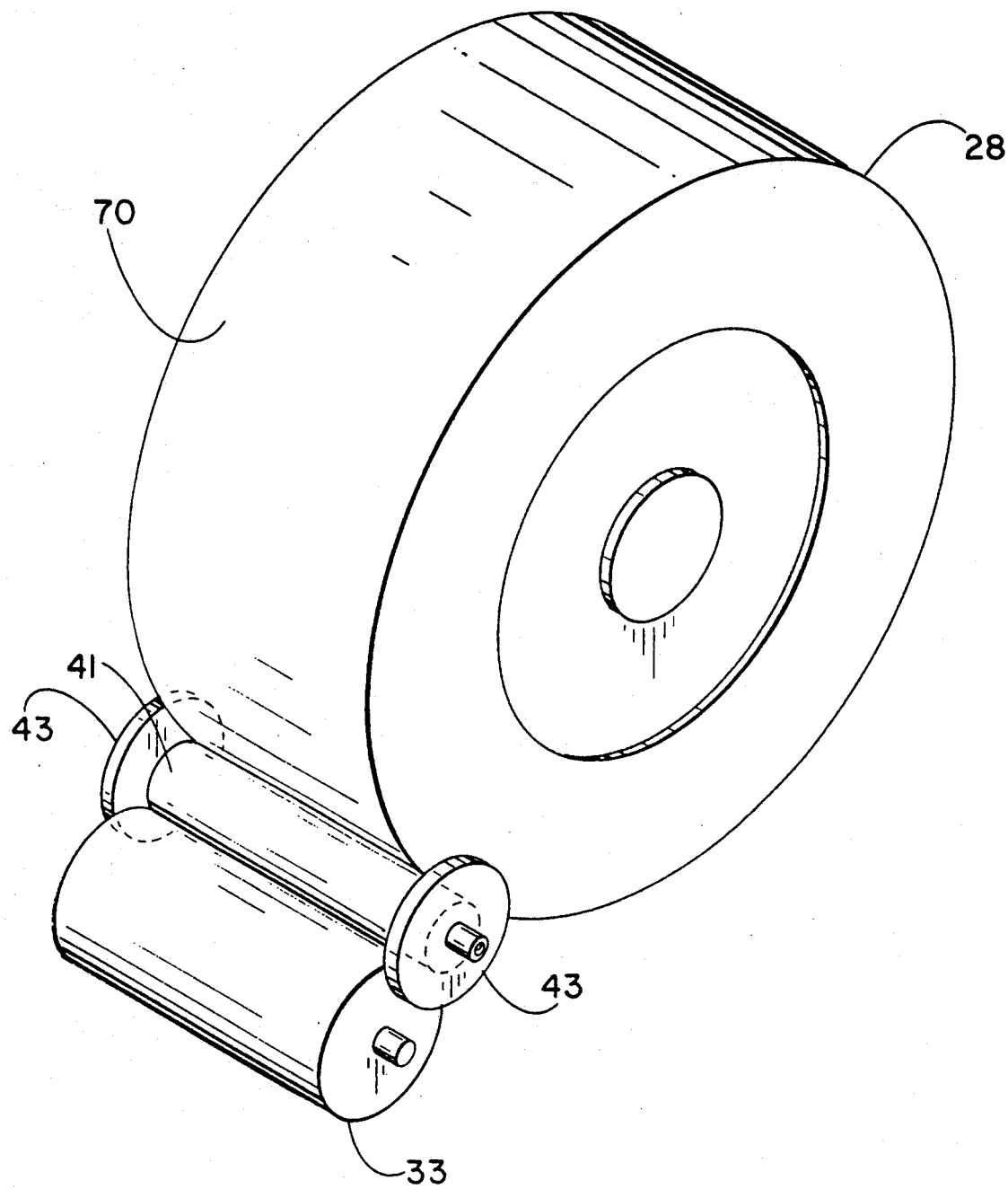
FIG. 6 is a diagrammatic perspective view of an idler wheel and alignment wheel, of one of my converter assemblies, each in driven relation to a drive-wheel.

Also mounted upon the mounting plates 31 and 32, and extending therebetween, is a pair of alignment rollers 41, 42, The forward alignment roller 41 bears against the circumferential surface of idler wheel 33. At each end of the roller 41 there is a radially outwardly extending alignment flange 43 as best seen in FIG. 6. These alignment flanges extending radially outwardly along the ends of the idler roller 33 and also along the sides of the drive-wheel 28 to maintain the converter assembly in alignment with the drive-wheel. The roller 41 also bears against the circumferential surface of the drive-wheel 28 in driven relation, as shown in FIG. 3 and FIG. 6. The roller 41 is rotatably mounted upon its shaft 44 in a conventional manner. The shaft 44 rides within a slot 45 formed in each of the mounting plates to permit the alignment roller 41 to move away from the idler roller 33 when substantial debris collects ahead of the rollers, thereby facilitating passage of the debris between the two rollers.

Alignment roller 42 is constructed and mounted in a manner similar to that of alignment roller 41. As shown, it has a pair of radially outwardly extending alignment flanges 46, one at each end, and is rotatably mounted on its shaft 47. Shaft 47 rides within slot 48 which is formed in each of the mounting plates 31 and 32. The circumferential surface of roller 42 bears against the circumferential surfaces of both drive-wheel 28 and idler wheel 34.

Mounted upon the forward end of the mounting plates 31 and 32 is a lead roller 49 which is rotatably mounted on its shaft 50. The latter rides within a slot 51 which is formed in each of the mounting plates and is held in track-tightening position by a pressure block 52, shown best in FIG. 5C. Pressure block 52 rides within a way 53, which is carried upon the inner surface of each of the mounting plates 31 and 32 at their forward ends. As shown, pressure block 52 has a pair of openings 54 and 55 extending therethrough which match openings 56 and 57 formed in each of the mounting plates. Bolts 65 and 66 extend through these openings once the pressure blocks 52 are urged, as hereinafter described, to cause the track 61 to be tightened.

Each of the lead rollers 49 is elevated relative to its associated idler wheel 33. The preferred range of elevation of the lower surface of the lead roller 49 relative to the lowest surface of idler wheel 33 is 25°–30°, the preferred elevation being 30°. However, the lead roller 49 may be mounted if denied with its lowest surface elevated within a range of 5°–40° relative to the lowest surface of the idler wheel 33.

Track 61 is an elongated loop of reinforced rubber material which is of a predetermined circumference substantially equal to, but slightly larger than that needed to surround the drive-wheel and the converter assembly, once it has been applied to the drive-wheel. As shown, it has a plurality of adjacent guide tabs 62 arranged at each of its sides throughout its length and extending inwardly just inside the lower edge of the two mounting plates 31 and 32 and, as shown in FIG. 7, in substantial alignment with the alignment flanges 43 and 46 of the alignment rollers.

To apply one of my converter assemblies to the drive-wheel of a tractor, the tractor is first elevated so that the drive-wheel will clear the ground by 2–6 inches. The track 61 is then applied to the upper surface of the drive-wheel, as shown in FIG. 4A, so that the track extends forward and aft of the wheel, as shown, along the ground. The inner mounting plate 32 is then inserted to extend along the inner side of the drive-wheel and the idler wheels 33 and 34 are applied thereto by inserting their shafts into their respective tubular sockets 37 and securing same thereto.

Figure 4B:
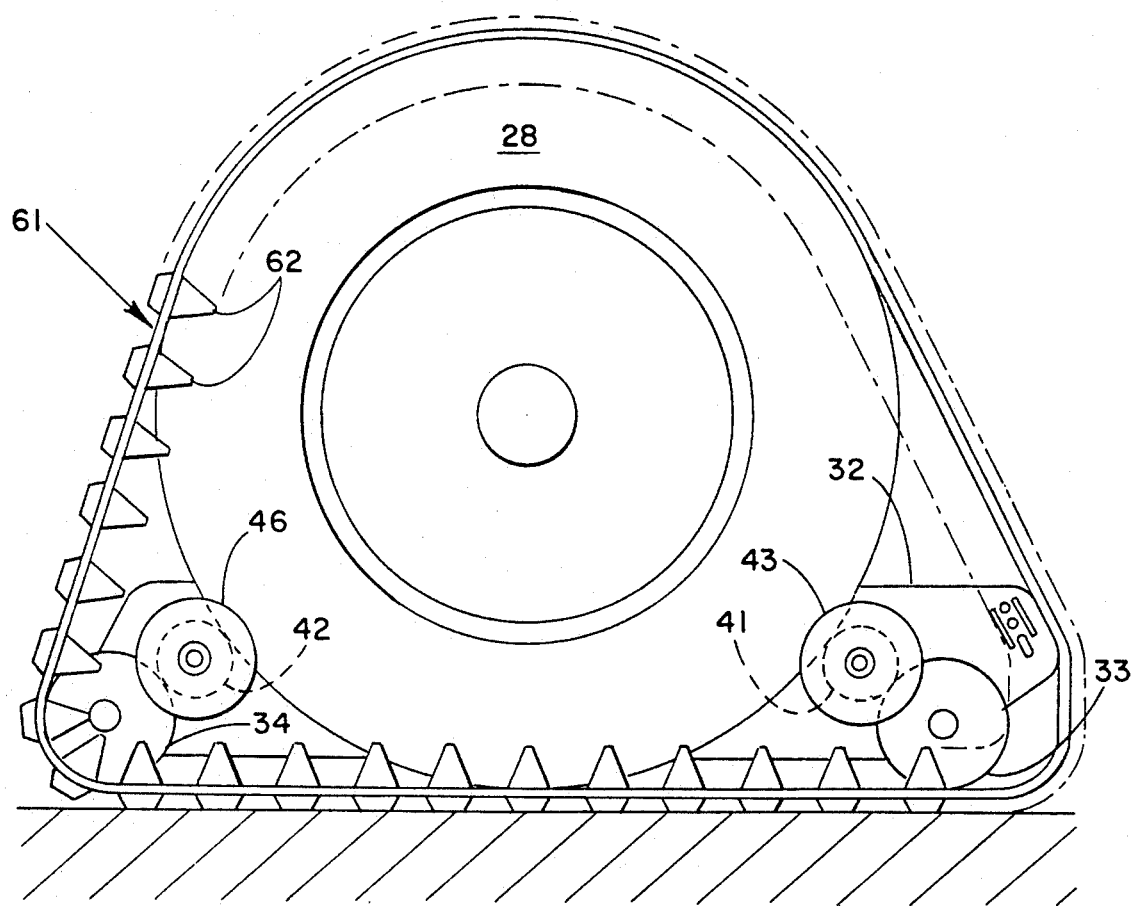
FIG. 4B is a diagrammatic side elevational view illustrating the second step utilized in applying one of my converter assemblies to a tractor drive-wheel.

The next step is to apply the two alignment rollers 42 and 43 to the mounting plate 32 at their inner ends, as shown in FIG. 4B. The shafts of these alignment rollers are threadedly tapped at each of their ends and they are of such a length that they terminate flush with the outer surfaces of the two mounting plates. One end of each alignment roller 42 and 43 is inserted in the slot 45 and 48 of mounting plate 32. A mounting bolt 63 is threaded into the ends of the shaft to secure same to the mounting plate.

Figure 4C:
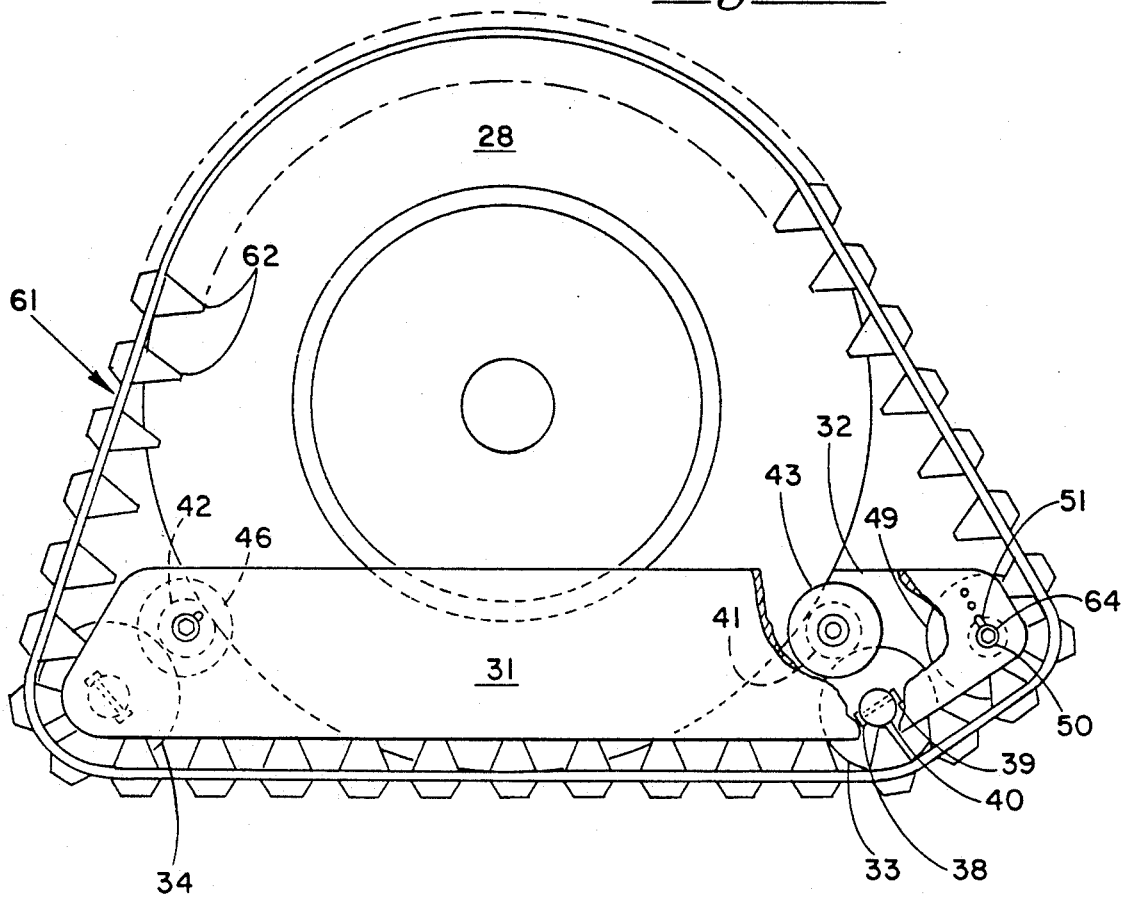
FIG. 4C is a diagrammatic side elevational view of the final step in applying the preferred form of my invention to a drive-wheel.
Figure 4D:
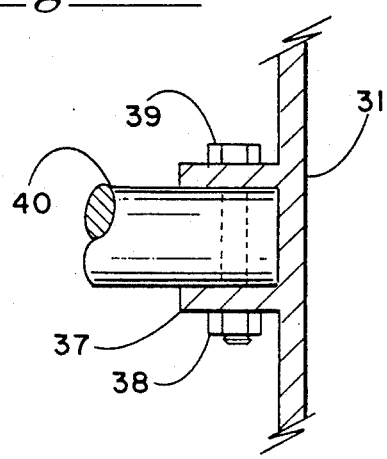
FIG. 4D is a diagrammatic fragmentary vertical sectional view showing the manner in which the shafts of the idler wheels are mounted upon the mounting plates of my converter assembly.

The third step in applying the assembly to the drive-wheel is to apply the lead roller 49 to the plate 32 as shown in FIG. 4C. The inner ends of the shaft 50 is inserted into the slot 51 and one of the two mounting bolts 64 is threaded into the threadedly tapped end of the shaft 50 upon which the lead roller is rotatably mounted.

Upon completing the above, the second mounting plate 31 is secured to the free ends of the idler wheels, alignment rollers, and lead roller in a similar manner. Once this has been accomplished, the assembly is completed except for tightening the track 61 which is accomplished by inserting a hydraulic ram between the drive-wheel 28 and the lead roller 49 and causing the ram to extend until the desired amount of tension upon track 61 is provided. Pressure blocks 52 are then inserted in ways 53 against the ends of shaft 50 and bolts 65 and 66 are inserted in openings 54 and 55, as they register with one or both of the openings 56 and 57 to secure the lead roller in the track-tightening position. Once this has been accomplished, the converter assembly has been applied to the drive-wheel 28 so as to be able to accomplish its intended purpose. If desired, a loose safety chain (not shown) may extend between the inner mounting plate 32 and some portion of the tractor frame.

Upon occasion it may be desirable not to have the idler wheels in driven relation (as shown in FIGS. 1–7, inclusive) to the alignment rollers and drive-wheel. When this is desired, I utilize the washer shim 67 shown in FIG. 5A to prevent the shafts 44 and 47 from extending into the lower ends of slots 45 and 48. The shim 69 which is carried by the washer 68 is inserted below each end of each of the shafts of the alignment rollers, with the washer 68 bearing against the outside surface of its associated mounting plate. In this manner, the circumferential surface of the alignment rollers is held at a distance from the circumferential surface of the idler wheel in non-driving relation thereto, as shown in FIG. 5B.

As best shown in FIG. 6, I prefer to remove the rubber tire which is normally mounted as the drive-wheel 28 of a tractor and substitute therefor a flat surface such as identified by the numeral 70. When alignment flanges 43 and 46 are utilized on the alignment rollers, the surface 70 can be perfectly flat. However, when such flanges are not used, a central alignment groove may be utilized as shown in FIGS. 9–12, inclusive.

The preferred embodiment shown in FIGS. 1–7, inclusive, has a number of distinct advantages. It is extremely simple in construction and, relatively speaking, of very light weight. It is very inexpensive to manufacture and is easy to apply or remove from a tractor. Since it is unattached, relative to the frame of the tractor, except for the track which surrounds the drive-wheel of the tractor and the entire converter assembly, it is much less costly to build and can be much more easily applied or removed from the tractor. Moreover, it requires the owner to own only one tractor, since it can be easily and quickly converted from a drive-wheel driven tractor to a track-driven tractor and vise versa.

Since my converter assembly is detached with respect to the frame of the tractor, it presents no problem for use in conjunction with a bar axle or planetary axle, either of which is a problem when a conventional track is mounted upon the frame of the tractor.

Another advantage of my converter assembly is that it permits the main drive-wheel to remain adjustable for width settings on the axle. Also, it allows the use of the same diameter drive-wheel, so that existing gearing of the tractor can be utilized. It is self-aligning and self-tightening and provides a smoother ride over rough terrain because of its longer plane on the ground and its "rocking" action over obstacles. Moreover, it readily climbs over obstacles which other track-driven machines find require circumvention.

My converter assembly is easy to install and remove—only a single wrench is required. It is low in initial cost and very easy and inexpensive to maintain.

It will readily be seen that my converter assembly substantially extends the plane of contact with the ground and thus greatly increases traction. At the same time, it distributes the weight of the entire machine over a much greater area than a conventional drive-wheel and thus avoids compaction while increasing traction.

Other forms of my invention are shown in FIGS. 8–12, inclusive. None of these embodiments include the use of the lead roller, yet they function in a satisfactory manner, particularly in areas where there are no obstructions of substantial consequence. FIG. 8A, for example, shows a tractor drive-wheel 72 with one of my converter assemblies 73 thereunder in supporting relation, and a track 74 extending around both. As shown, it includes a drive-wheel 72 disposed between a pair of mounting plates 75 and 76 similar to those shown in my above preferred embodiment, with idler wheels 77 and 78 and alignment rollers 79 and 80 rotatably mounted thereon in a manner similar to that described with respect to FIGS. 1–7, inclusive. It will be seen that the forwardmost surface of idler wheel 77 is directly below the forwardmost surface of drive-wheel 72, and that the rearwardmost surface of idler wheel 78 is directly below the rearwardmost surface of drive-wheel 72. Further details of the construction will be set forth hereinafter, after a brief description of FIGS. 8B and 8C.

Figure 8A:
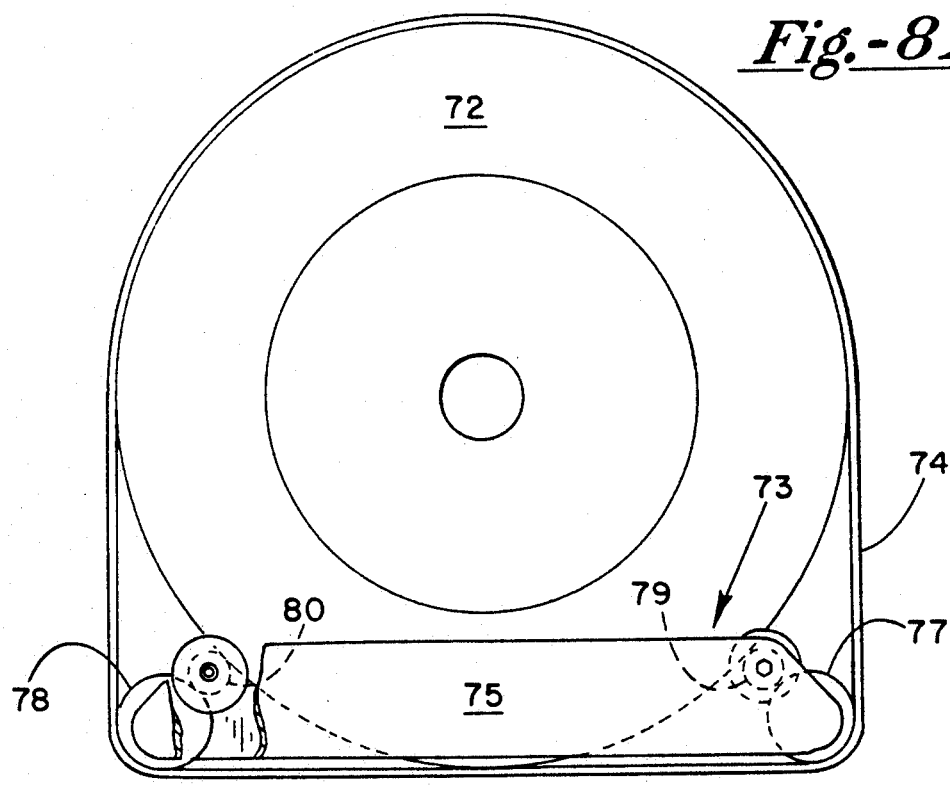
FIG. 8A is a diagrammatic side elevational view of a second embodiment of my invention mounted on a drive-wheel and in which I do not utilize the lead roller, and the forwardmost and rearwardmost surface of the idler wheels are directly below the corresponding surfaces of the drive-wheel.
Figure 8B:
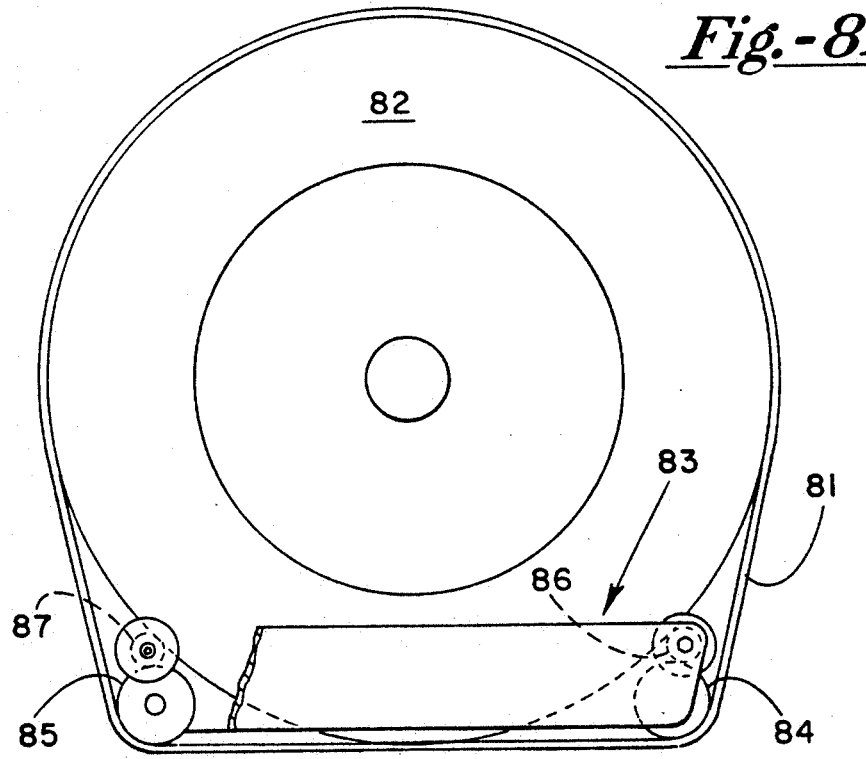
FIG. 8B is a diagrammatic side elevational view of a third embodiment of my invention mounted on a drive-wheel without the lead roller and with the idler wheels disposed inwardly of the forwardmost and rearwardmost surface of the drive-wheel.

FIG. 8B shows a somewhat similar arrangement as that shown in FIG. 8A. Thus, a track 81 encircles the drive-wheel 82 and my converter assembly 83. Idler wheel 84 is positioned so that its forwardmost surface is behind the forwardmost surface of the drive-wheel 82, and idler wheel 85 is positioned so that its rearwardmost surface is ahead of the rearwardmost surface of the drive-wheel 82. Alignment roller 86 is in driving relation to idler wheel 84 and in driven relation to drive-wheel 82. Likewise, alignment roller 87 is in driving relation with idler wheel 85 and in driven relation to drive-wheel 82.

Figure 8C:
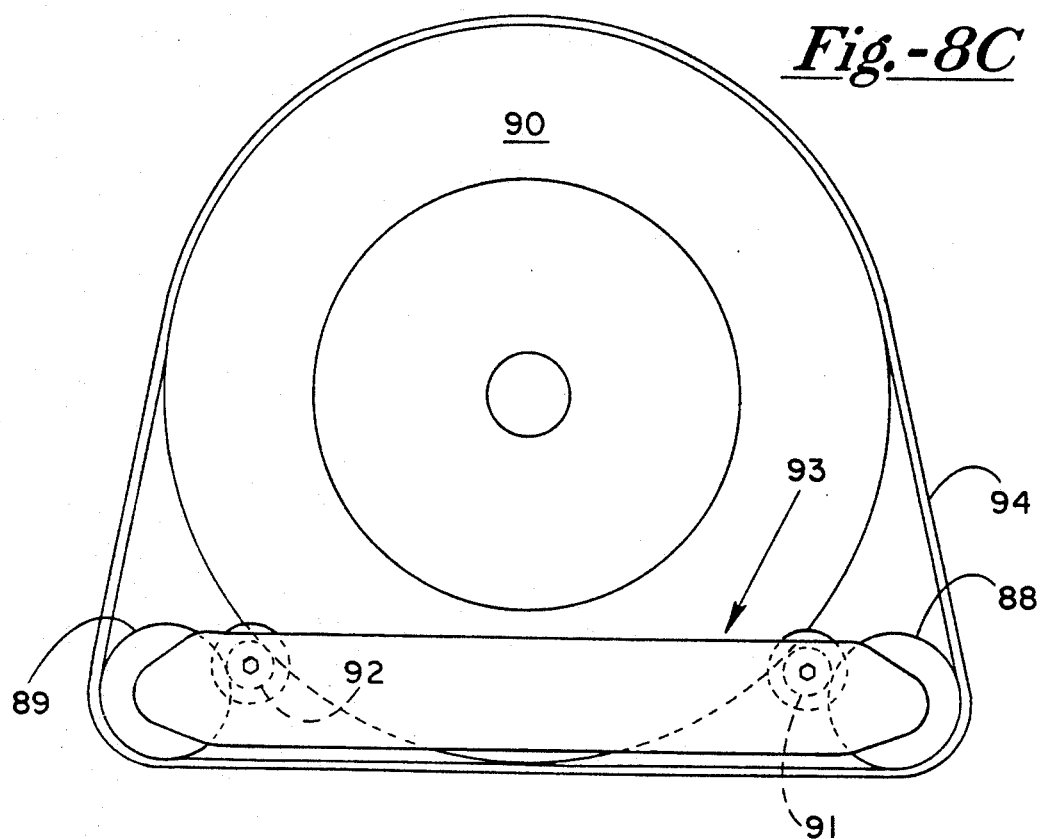
FIG. 8C is a diagrammatic side elevational view of a fourth embodiment of my invention mounted on a drive-wheel without the lead roller, and with the idler wheels disposed outwardly of the forwardmost and rearwardmost surface of the drive-wheel.

FIG. 8C shows an embodiment preferred to that shown in FIGS. 8A and 8B in that the idler wheels 88 and 89 are each disposed outside the vertical confines of drive-wheel 90. Alignment rollers 91 and 92 are disposed in driving relation to idler wheels 88 and 89, respectively and in driven relation to drive-wheel 90. Track 94 encircles the drive-wheel 90 and the entire converter assembly 93. In each of FIGS. 8A-C, inclusive, the idler wheels and alignment wheels are rotatably mounted in driven relation on a pair of transversely spaced mounting plates similar to those described and shown in FIGS. 1-7, inclusive.

Figure 9:
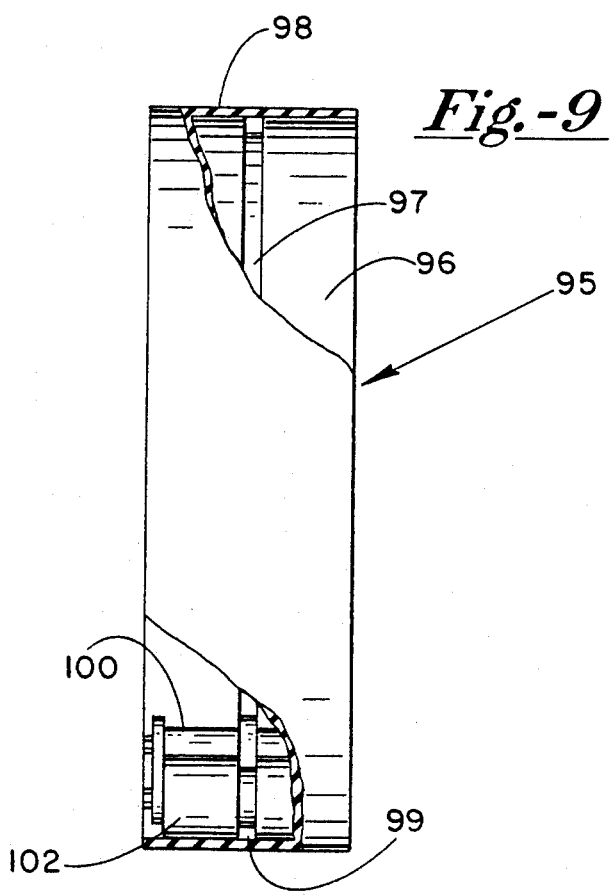
FIG. 9 is a diagrammatic front elevational view of a drive-wheel of a tractor utilized in combination with one of my converter assemblies, with portions thereof broken away.
Figure 10:
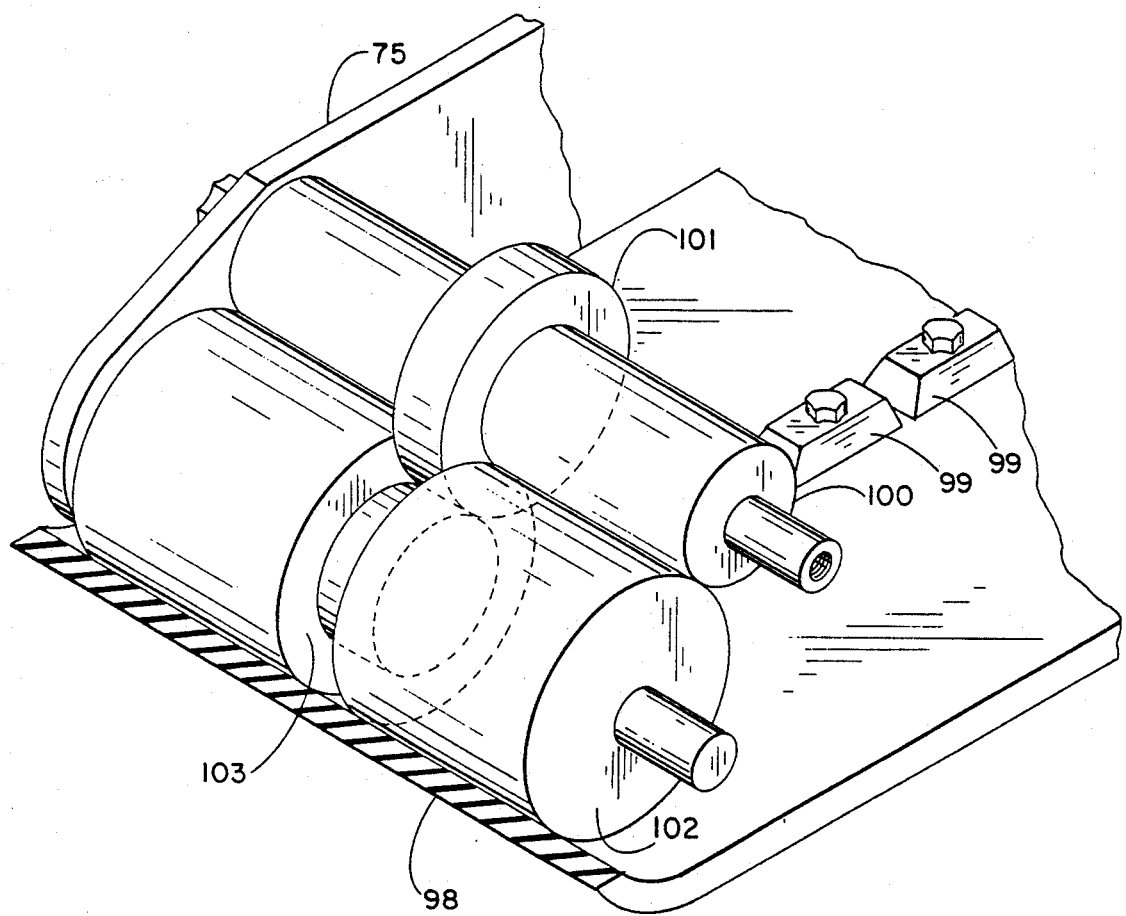
FIG. 10 is a diagrammatic perspective view of one end portion of one of my converter assemblies with the near mounting plate removed and the track shown partially in section.

The tracks, drive-wheels, alignment rollers, and idler rollers shown in FIGS. 8A-C, inclusive, are all constructed in a similar manner, as hereinafter described, and as shown in FIGS. 9-12, inclusive. Thus, the drive-wheel 95 has a flat exterior surface 96 and a centrally located circumferentially extending groove 97 formed in its outer surface. The track 98 which extends therearound, has a centrally aligned series of replaceable guide lugs 99 secured to the inner surface of the track, as best shown in FIG. 10, and extending along a circumferential line midway between the side edges of the track.

Figure 11:
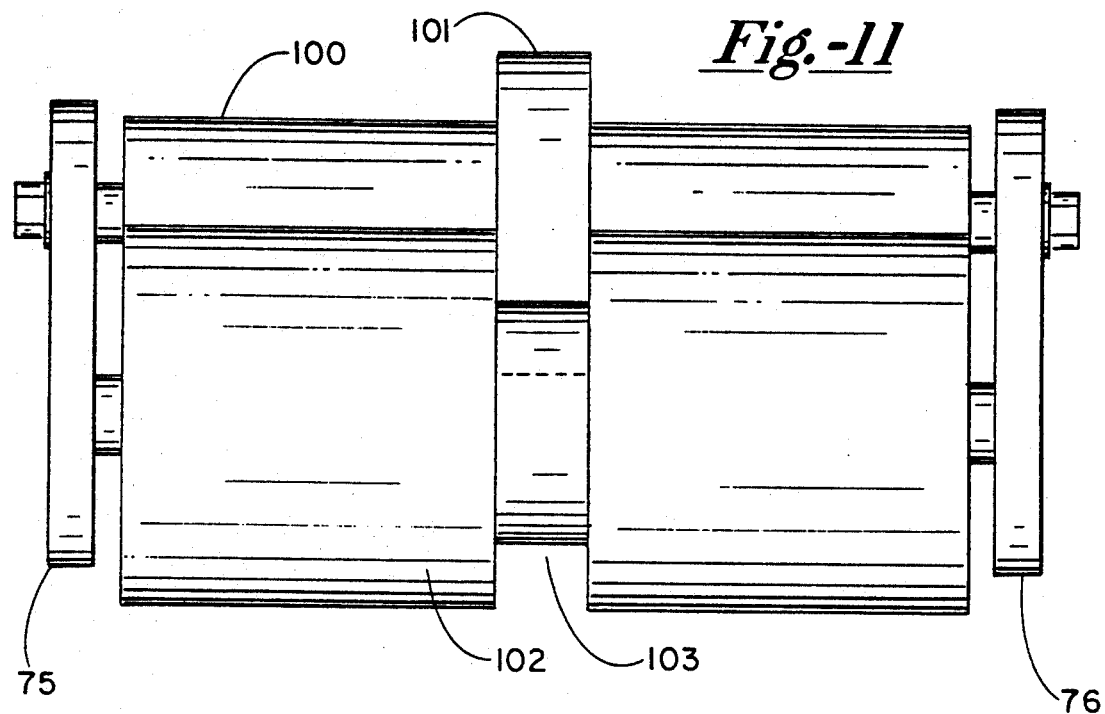
FIG. 11 is a diagrammatic front elevational view of the end portion shown in FIG. 10, with the track removed.
Figure 12:
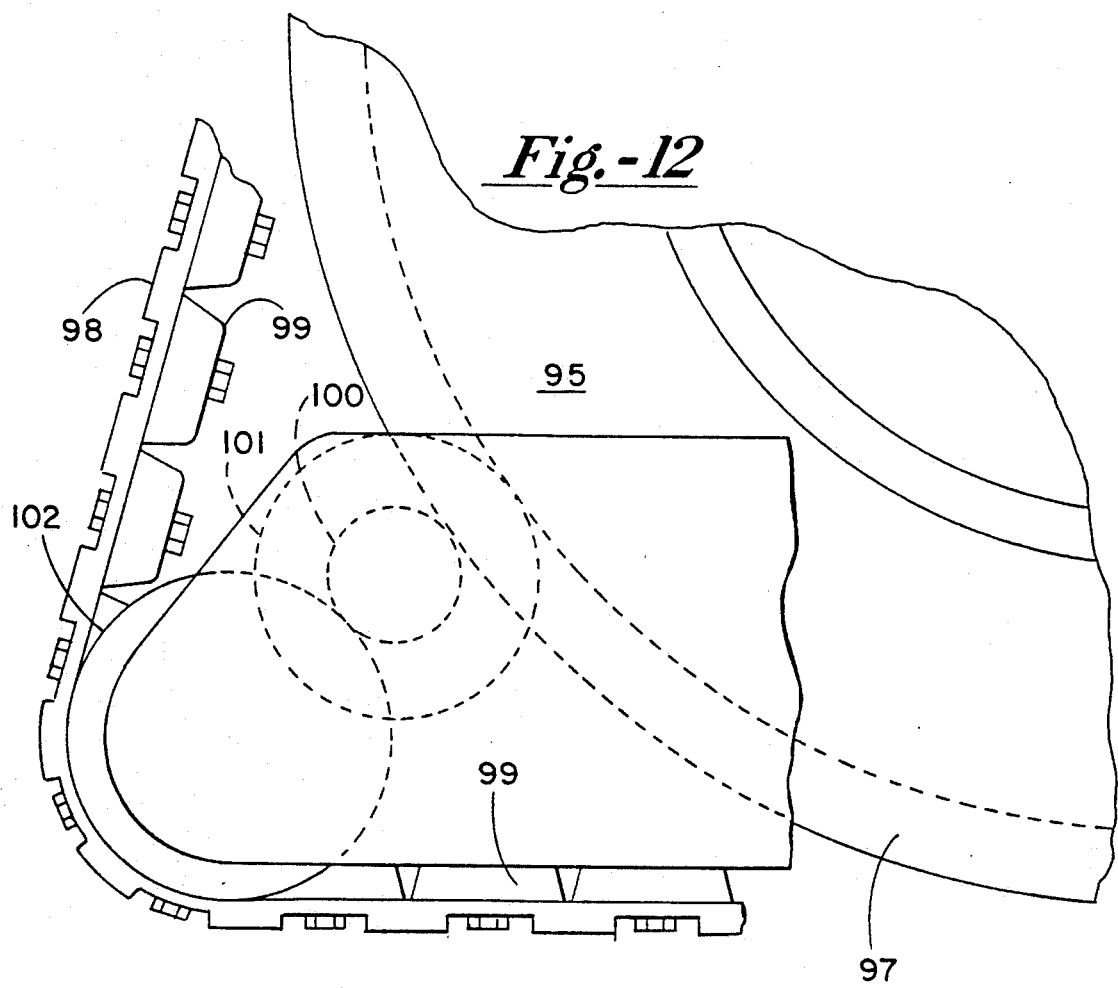
FIG. 12 is a diagrammatic fragmentary side elevational view of the end portion shown in FIG. 10, with a portion of the drive-wheel added thereto.

For the sake of convenience, the idler wheels and alignment rollers have been given new numbers in FIG. 10-12, inclusive. By reference to FIG. 10 it will be seen that the alignment rollers 100 each have a circumferentially extending guide rib 101 extending radially outwardly from their outer surfaces, midway between their ends.

It will also be seen that each of the idler wheels 102 has an annular channel 103 formed in its outer surfaces and shaped to match and receive the guide rib 101 therewithin. Reference to FIG. 9 and FIG. 12 shows that the guide ribs 101 also extend into the groove 97 of the drive-wheel 95. Thus, the alignment roller 100 maintains the entire converter assembly, including the idler roller and the track in aligned relation via the guide rib 101 with the drive-wheel 95. It will be noted that the lugs 99 ride within channel 103 as the track 98 passes around idler wheel 102, which aids in maintaining the track 98 in aligned relation with the drive-wheel 95. If desired, drive wheel 95 may carry a series of outwardly extending drive teeth (not shown) within its channel 97, arranged to extend between each of the legs 99, in driving relation to the track 98.

The three embodiments of my invention, which are shown in FIGS. 8-12, inclusive, utilize a different manner of maintaining the converter assembly in alignment with the drive-wheel. They also are devoid of the lead roller which is not required when adequately cleared fields are being worked. These embodiments, however, provide most of the advantages described hereinbelow with respect to the embodiment shown in FIGS. 1-7, inclusive, since they function adequately and provide most, if not all, of the advantages as listed, with the exception of the increased facility for climbing over obstacles. Each of them provides an even distribution of the weight of the tractor and increased traction. Likewise, each of them provides the advantages of light weight, inexpensive cost to manufacture, detached relation to the tractor frame, quick and easy application to and removal from the tractor, use of standard tractor gearing, etc.

It will, of course, be understood that various changes may be made in the form, details, arrangement and proportions of the parts without departing from the scope of the invention which consists of the matter shown and described herein and set forth in the appended claims.

I claim:

1. A track-driven vehicle comprising:
   (a) a tractor having at least one pair of drive-wheels;
   (b) a pair of auxiliary-drive-assemblies separate from said tractor and each of which is associated with and disposed beneath one of said drive-wheels in at least partial load-bearing relation, each of said auxiliary-drive-assemblies being comprised of:
      (1) a pair of opposite elongated, transversely spaced, substantially parallel, rigid mounting members each of which has opposite end portions and extends forwardly and rearwardly of the axis of its associated drive-wheel;
      (2) a pair of idler wheel members each rotatably mounted upon and between said mounting members at opposite end portions of said mounting members for rotation about an axis substantially parallel to and below the axis of its associated drive-wheel;
      (3) a pair of roller members each of which is rotatably mounted upon one of said opposite end portions of said mounting members between said drive-wheel and one of said idler wheel members and above and between said idler wheel members for rotation about an axis substantially parallel to the axis of its associated drive-wheel, each of said roller members including means for maintaining its associated drive-wheel and idler wheel member in aligned relation; and
      (4) said idler wheel members each having a circumferential periphery the lowest portion of which lies in a horizontal plane adjacent the horizontal plane of the lowest circumferential periphery of said associated drive-wheel; and
   (c) a continuous flexible track extending tautly around said drive-wheel and said idler wheel members in driven relation thereto to thereby provide a track drive for said tractor.

2. The structure defined in claim 1, wherein said roller members are mounted in substantially the same horizontal plane, and said idler wheel members are each mounted in a single lower plane.

3. The structure defined in claim 1, wherein the forwardmost circumferential periphery of the forwardmost of said idler wheel members and the rearwardmost circumferential periphery of the rearwardmost of said idler wheel members are disposed substantially directly below the forwardmost and rearwardmost circumferential periphery, respectively, of said associated drive-wheel.

4. The structure defined in claim 1, wherein the forwardmost periphery of the forwardmost of said idler wheel members is disposed forwardly of the forwardmost circumferential periphery of said drive-wheel, and the rearwardmost periphery of the rearwardmost idler wheel member is disposed rearwardly of the rearwardmost circumferential periphery of said drive-wheel.

5. The structure defined in claim 1, wherein the forwardmost periphery of the forwardmost of said idler wheel members is disposed rearwardly of the forwardmost circumferential periphery of said drive-wheel, and the rearwardmost periphery of the rearwardmost idler wheel member is disposed forwardly of the rearwardmost circumferential periphery of said drive-wheel.

6. The structure defined in claim 1, wherein said idler wheel members are in at least partially supporting relation to said associated drive-wheel.

7. The structure defined in claim 1, wherein each of said idler wheel members has a pair of opposite ends and a circumferential guide recess disposed intermediate said ends, and has one of said roller members associated therewith, with portions of said roller member extending into said guide recess to cooperatively maintain said roller member and idler wheel member in aligned relation.

8. The structure defined in claim 1, wherein each of said roller members has a pair of opposite ends and has a circumferentially disposed, radially outwardly-extending alignment element extending into one of said idler wheel members as said members rotate to effectively maintain said idler wheel in aligned relation therewith.

9. The structure defined in claim 1, wherein each of said roller members is disposed in driving relation with one of said idler wheel members, one of said so disposed members having a circumferential guide recess formed therein and the other of said so disposed members having a circumferential and radially outwardly-extending alignment element extending into said circumferential recess to effectively maintain said so disposed members in aligned relation.

10. The structure defined in claim 1, wherein each of said auxiliary-drive-assemblies is completely detached from said tractor except for said track which encircles said drive-wheel and said idler wheel members.

11. The structure defined in claim 1, wherein each of said drive-wheels has an annular circumferentially extending recess in its circumferential periphery and each of said roller members has a radially outwardly extending alignment element at its circumferential periphery extending into said recess to maintain said roller member in aligned relation with said drive-wheel.

12. The structure defined in claim 1, wherein at least one of said roller members is movably mounted at its axis for rotation upon its said mounting members to permit said mounting members and an idler wheel member mounted thereon adjacent said roller member to move away from said roller member and thereby permit trash to pass between said roller member and said idler wheel member.

13. The structure defined in claim 9, wherein said track has a series of cooperative guide elements secured to the interior surface of said track and arranged longitudinally thereof and extending into said guide recess of each of said idler wheels in cooperative guiding relation.

14. The structure defined in claim 13, wherein said guide elements are removably attached to said track.

15. The structure defined in claim 1, and a third idler wheel member rotatably mounted on each of said mounting members of each of said auxiliary-drive-assemblies adjacent, ahead, and above its most forward idler wheel member and within said track in track-supporting relation, said third idler wheel member having an outer circumferential surface the lowest portion of which is elevated relative to the lowest portion of the circumferential surface of said adjacent idler wheel member.

16. The structure defined in claim 15, wherein said lowest portion of said circumferential surface of said third idler wheel is disposed at an elevation of approximately 5°–40° relative to the lowest portion of the circumferential surface of said adjacent idler wheel member.

17. The structure defined in claim 15, wherein said lowest portion of said circumferential surface of said third idler wheel is disposed at an elevation of approximately 25°–30° relative to the lowest portion of the circumferential surface of said adjacent idler wheel member.

18. The structure defined in claim 15, wherein said lowest portion of said circumferential surface of said third idler wheel is disposed at an elevation of approximately 30° relative to the lowest portion of the circumferential surface of said driven idler wheel.

19. A track-driven vehicle comprising:
(a) a tractor having at least one pair of drive-wheels;
(b) a pair of auxiliary-drive-assemblies separate from said tractor and each of which is associated with and disposed beneath one of said drive-wheels, each of said auxiliary-drive-assemblies being comprised of:
  (1) a pair of opposite elongated, transversely spaced, substantially parallel, rigid mounting members each of which has opposite end portions and extends forwardly and rearwardly of the axis of its associated drive-wheel;
  (2) a pair of idler wheel members each rotatably mounted upon and between said mounting members at opposite end portions of said mounting members for rotation about an axis substantially parallel to and below the axis of its associated drive-wheel;
  (3) a pair of roller members each of which is rotatably mounted upon one of said opposite end portions of said mounting members between said drive-wheel and one of said idler wheels and above and between said idler wheel members for rotation about an axis substantially parallel to the axis of its associated drive-wheel, each of said roller members being mounted in driven load-bearing relation to its associated drive-wheel; and
  (4) said idler wheel members each having a circumferential periphery the lowest portion of which lies in a horizontal plane adjacent the horizontal plane of the lowest circumferential periphery of said associated drive-wheel;
(c) each of said auxiliary-drive-assemblies including alignment means disposed adjacent said associated drive-wheel in position to engage the same in aligning relation and thereby maintain said assembly in alignment therewith; and (d) a continuous flexible track extending tautly around said drive-wheel and said idler wheels in driven relation thereto to thereby provide a track-drive for said tractor.

20. A track-driven vehicle comprising:
(a) a tractor having at least one pair of drive-wheels;
(b) a pair of auxiliary-drive-assemblies separate from said tractor and each of which is associated with and disposed beneath one of said drive-wheels, each of said auxiliary-drive-assemblies being comprised of:
  (1) a pair of opposite elongated, transversely spaced, substantially parallel, rigid mounting members each of which has opposite end portions and extends forwardly and rearwardly of the axis of its associated drive-wheel;
  (2) a pair of idler wheels each rotatably mounted upon and between said mounting members at opposite end portions of said mounting members for rotation about an axis substantially parallel to the axis of its associated drive-wheel;
  (3) a pair of rollers each of which is rotatably mounted upon separate opposite end portions of said mounting members between said drive-wheel and one of said idler wheels and above and between said idler wheels for rotation about an axis substantially parallel to the axis of its associated drive-wheel, each of said rollers being mounted in load-bearing relation to its associated drive-wheel and including means for maintaining its associated drive-wheel and idler wheel in aligned relation; and
  (4) said idler wheels each having a circumferential periphery the lowest portion of which lies in a horizontal plane adjacent the horizontal plane of the lowest circumferential periphery of said associated drive-wheel; and
(c) a continuous flexible track extending tautly around said drive-wheel and said idler wheels in driven relation thereto to thereby provide a track-drive for said tractor.

21. A track-driven vehicle comprising:
(a) a tractor having at least one pair of drive-wheels on a common axis;
(b) a pair of auxiliary-drive-assemblies separate from said tractor and each of which is associated with and disposed below the axis of one of said drive-wheels in driven relation thereto, and includes at least a pair of rotatable members each of which is rotatably mounted outside the circumferential periphery of said drive-wheel for rotation about an axis substantially parallel to and at opposite sides of the axis of said drive-wheel with the lower portion of its circumferential periphery adjacent the plane of the lower portion of the circumferential periphery of said drive-wheel and being driven indirectly by said drive-wheel;
(c) means for transmitting at least a portion of the load upon said drive-wheels to each of said auxiliary-drive-assemblies;
(d) each of said auxiliary-drive-assemblies being unsupported by said tractor and including rotary aligning means engaging one of said drive-wheels in aligning relation and maintaining the assembly in which it is included in aligned relation with the drive-wheel engaged by said aligning means; and
(e) a continuous flexible drive-track extending tautly around said drive-wheel and said rotatable members in driven relation to said drive wheel to provide a track-drive for said tractor.

22. The structure defined in claim 21, wherein each of said auxiliary-drive-assemblies includes a pair each of mounting members, idler wheels, and rotary alignment members all constructed and arranged to receive a tractor drive-wheel thereupon in at least partially supporting relation and a continuous flexible drive track therearound in taut encircling relation with respect thereto, and with respect to such a tractor drive-wheel.

23. The structure defined in claim 21, wherein each of said drive-assemblies includes a pair of roller members each of which is rotatably mounted in driving relation to one of said rotatable members and in driven relation to said associated drive-wheel.

24. The structure defined in claim 23, wherein at least one of said roller members and one of said rotatable idler members have interengaging alignment elements at their circumferential peripheries which maintain said members in aligned relation.

25. The structure defined in claim 22, and a third idler wheel rotatably mounted on each of said mounting members ahead and above one of said idler wheels and within said track in track supporting relation, said third idler wheel having an outer circumferential surface the lowest portion of which is disposed at an elevation approximately 5° to 40° above the lowest portion of the circumferential surface of said one idler wheel.

26. The structure defined in claim 21, wherein said drive-track and each of said rotatable members has cooperative guide elements thereon cooperating together to maintain said track in aligned relation with said rotatable members.

27. The structure defined in claim 21, wherein each of said auxiliary-drive-assemblies includes a pair of parallel spaced mounting plates upon and between which at least one of said rotatable members is mounted for rotation, each of said rotatable members being mounted in non-attached relation to said tractor.

28. A converter assembly for use in conjunction with a flexible driven track in converting a tractor having a pair of drive-wheels into a track-driven vehicle comprising:
(a) a pair of rigid, substantially parallel, elongated mounting members having front and rear end portions;
(b) a pair of idler wheels each of which is rotatably mounted between and upon said mounting members at opposite end portions thereof;
(c) a pair of aligning rotary members each rotatably mounted between and upon said mounting members inwardly of and in aligning relation to one of said idler wheels;
(d) said mounting members being transversely spaced a sufficient distance to accommodate a tractor drive-wheel therebetween; and
(e) said rotary members being constructed and arranged to become load-bearing and including means to engage and be maintained in aligned relation with such a tractor drive-wheel when the latter is positioned between said mounting members from above and a flexible driven track is tautly strung around said idler wheels and the drive-wheel of the tractor.

29. The structure defined in claim 28 and, a tractor drive-wheel associated with said aligning rotary members and extending downwardly between said mounting members thereof in engaging and aligning relation to said aligning rotary members, and a flexible continuous track encircling said drive-wheel and said idler wheels in taut driven relation to said drive-wheel.

30. The structure defined in claim 28, wherein said idler wheels are mounted in the same horizontal plane.

31. The structure defined in claim 28, wherein said aligning rotary members are mounted in the same horizontal plane.

32. The structure defined in claim 28, wherein said aligning rotary members are mounted in the same horizontal plane and said idler wheels are each mounted in a lower horizontal plane.

33. The structure defined in claim 28, wherein each of said idler wheels has a circumferentially extending guide recess formed in its peripheral surface and one of said aligning rotary members has a radially outwardly-extending alignment element extending into said guide recess to cooperatively maintain said idler wheel and said aligning rotary member in alignment.

34. The structure defined in claim 28, wherein at least one of said aligning rotary members is mounted on said mounting members for rotation about its axis and for shifting movement of said axis to thereby permit the idler wheel in aligned relation thereto to move away from said aligning rotary member to thereby enable trash or the like to pass between said aligning rotary member and the idler wheel with which it is aligned.

35. The structure defined in claim 29, and a third idler wheel rotatably mounted on each of said mounting members ahead and above one of said pair of idler wheels and within said track in track-supporting relation, said third idler wheel having its axis disposed parallel to the axis of said idler wheels and having an outer circumferential surface the lowest portion of which is elevated relative to the lowest portion of the circumferential surface of the idler wheel of said pair most adjacent thereto.

36. The structure defined in claim 35, wherein said lowest portion of said circumferential surface of said third idler wheel is disposed at an elevation of approximately 25° to 30° relative to the lowest portion of the circumferential surface of said pair of idler wheels.

37. The structure defined in claim 35, wherein said lowest portion of said circumferential surface of said third idler wheel is disposed at an elevation of approximately 30° relative to the lowest portion of the circumferential surface of said other idler wheels.

38. A converter unit for use in converting a tractor having a pair of rear drive-wheels into a track-driven vehicle comprising:
 (a) a continuous flexible track of sufficient predetermined length to extend around one of such drive-wheels with length to spare; and
 (b) an auxiliary-drive-assembly for disposition within said track between the same and such a drive-wheel, said auxiliary-drive-assembly including:
  (1) a rigid mounting device having a pair of elongated, transversely spaced, substantially parallel, rigid mounting members each of which has opposite end portions and extends in length approximating the diameter of such a drive-wheel;
  (2) a pair of idler wheels each rotatably mounted within said track and upon, between, and normal to opposite end portions of said mounting members; and
  (3) a pair of rotary alignment members each of which is rotatably mounted upon said mounting members above, between, and parallel to said idler wheels and in aligning relation to one of said idler wheels and in position to engage such a tractor drive-wheel from below in engaging relation thereto, whereupon said track and auxiliary drive assembly will constitute a track drive for such a tractor.

39. A converter unit for use in converting a tractor having a pair of rear drive-wheels into a track-driven vehicle comprising:
 (a) a continuous flexible track of sufficient predetermined length to extend around one of such drive-wheels with length to spare; and
 (b) an auxiliary-drive-assembly for disposition within said track between the same and such a drive-wheel, said auxiliary-drive-assembly including:
  (1) a rigid mounting device having a pair of elongated, transversely spaced, substantially parallel, rigid mounting members each of which has opposite end portions and extends in length approximately the diameter of such a drive-wheel;
  (2) a pair of idler wheels each rotatably mounted within said track and upon, between, and normal to opposite end portions of said mounting members;
  (3) a pair of rotary members each of which is rotatably mounted upon said mounting members above, between, and parallel to said idler wheels in position to engage such a tractor drive-wheel from below in load-bearing relation thereto; and
  (4) alignment means carried by said mounting device and disposed in position to engage such a tractor drive-wheel in cooperative aligning relation whereupon said track and auxiliary drive assembly will constitute a track-drive for such a tractor.

40. The structure defined in claim 39, and a third idler wheel rotatably mounted upon and between said mounting members adjacent to, ahead, parallel to, and above one of said idler wheels of said pair, said third idler wheel having an outer circumferential surface the lowest portion of which is disposed at an elevation of approximately 25° to 30° relative to the lowest portion of the circumferential surface of said adjacent driven idler wheel.

* * * * *